United States Patent
Gurevich et al.

(10) Patent No.: US 11,193,811 B2
(45) Date of Patent: Dec. 7, 2021

(54) METHOD FOR VERIFYING A FLOWMETER AND DEVICE FOR THE IMPLEMENTATION THEREOF

(71) Applicant: "OIL AND GAS MEASUREMENT TECHNOLOGY" LTD, Moscow (RU)

(72) Inventors: Mihail Samuilovich Gurevich, Moscow (RU); Andrey Vasilevich Safonov, Moscow (RU); Natalya Vasilevna Danilenko, Moscow (RU)

(73) Assignee: "OIL AND GAS MEASUREMENT TECHNOLOGY" LTD, Moscow (RU)

( * ) Notice: Subject to any disclaimer, the term of this patent is extended or adjusted under 35 U.S.C. 154(b) by 107 days.

(21) Appl. No.: 16/479,942

(22) PCT Filed: Sep. 20, 2017

(86) PCT No.: PCT/RU2017/000680
§ 371 (c)(1),
(2) Date: Jul. 23, 2019

(87) PCT Pub. No.: WO2019/059795
PCT Pub. Date: Mar. 28, 2019

(65) Prior Publication Data
US 2019/0376832 A1 Dec. 12, 2019

(51) Int. Cl.
*G01F 25/00* (2006.01)
(52) U.S. Cl.
CPC ...... *G01F 25/0092* (2013.01); *G01F 25/0015* (2013.01)
(58) Field of Classification Search
CPC .................................................. G01F 25/0015
See application file for complete search history.

(56) References Cited

U.S. PATENT DOCUMENTS 3,541,837 A * 11/1970 Davis .................. G01F 25/0015
73/1.18
3,643,489 A * 2/1972 Davis .................. G01F 25/0015
73/1.18

(Continued)

FOREIGN PATENT DOCUMENTS

| RU | 2522118 C1 | 7/2014 |
| RU | 2568054 C1 | 11/2015 |
| RU | 2603503 C1 | 11/2016 |

*Primary Examiner* — Paul M. West
*Assistant Examiner* — Mark A Shabman
(74) *Attorney, Agent, or Firm* — Nixon & Vanderhye PC

(57) ABSTRACT

The invention relates to inspection and measuring technology for use in the calibration, verification and routine monitoring of the metrological characteristics of volume flow and mass flow meters and calibration rigs, primarily for petroleum and petroleum products. The special feature of the present method for monitoring the metrological characteristics of a flowmeter using a bidirectional prover is that the portion of the prover situated at the end of the path of travel of a ball and acting as an accelerator during the opposite movement of the ball is used on said path as an addition to the calibrated portion. The special feature of a bidirectional prover for implementing the present method is the installation of one or more detectors in a closed cross-section of the portion of the prover situated at the end of the travel path. The technical result is an increase in the accuracy and reliability of the measuring results, a reduction in the dimensions, mass and material intensity of the structure, a decrease in the duration of verification operations, and the mobility of the structure.

4 Claims, 5 Drawing Sheets

(56) References Cited

U.S. PATENT DOCUMENTS

| | | | | |
|---|---|---|---|---|
| 3,668,923 | A | * | 6/1972 | Grove ................ G01F 25/0015 73/1.17 |
| 3,738,153 | A | * | 6/1973 | Simmons ............ G01F 25/0015 73/1.17 |
| 3,798,957 | A | * | 3/1974 | Shannon ............. G01F 25/0015 73/1.18 |
| 4,237,921 | A | * | 12/1980 | Hayward ............ G01F 25/0015 137/268 |
| 9,581,486 | B2 | | 2/2017 | Rudroff |
| 2007/0119227 | A1 | * | 5/2007 | Moriyama .......... G01F 25/0015 73/1.16 |
| 2014/0137628 | A1 | | 5/2014 | Rudroff |
| 2015/0027197 | A1 | | 1/2015 | Rudroff |

\* cited by examiner

METHOD FOR VERIFYING A FLOWMETER AND DEVICE FOR THE IMPLEMENTATION THEREOF

This application is a national phase of International Application No. PCT/RU2017/000680 filed Sep. 20, 2017, the entire content of which is hereby incorporated by reference.

FIELD OF THE INVENTION

The present invention relates to the instrumentation used in the calibration, verification, monitoring of the metrological characteristics of volume and mass meters of liquids inside verification installations, mainly for petroleum and petroleum products.

BACKGROUND OF THE INVENTION

Monitoring of the metrological characteristics (MMC) of the volume and mass meters of liquids, verification installations for petroleum and petroleum products transported through pipelines (hereinafter referred to as measuring tools—MT) are carried out in accordance with the requirements of process regulations, other technical documentation, and as deemed necessary for maintenance and operation. Calibration and verification of MMC tools are special cases regulated in the regulatory documentation.

Calibration—a set of operations that establishes the relationship between the value of a parameter obtained using particular MT and the value of the same parameter obtained using the reference standard (exemplary MT, verified and approved as a reference standard in the prescribed manner). Calibration is performed at the initial setup of the device, or before its operation for a specific purpose, under certain conditions.

Verification—determination by an authorized body of a metrological service of the suitability of MT for use on the basis of experimental studies of the MT's errors. Verification is carried out, as a rule, with a regulated frequency.

A device called a verification (calibration) installation or a prover is usually used for calibration, verification or MMC of tools for measuring liquid flow (liquid meters).

Several types and designs of provers exist and are used: U-pipe-shaped piston provers, with a straight calibrated area, scorpion-type, with a spiral-type loop, and also compact provers (a separate class of provers). One of the most common types in the calibrating (verifying) systems for flowmeters of quantity and quality parameters for petroleum and petroleum products during their transportation through pipelines is an U-shaped piston installation; in English sources they are called U-shaped prover, loop-shaped prover, etc. The flow liquid volume measured by a being calibrated meter, is passed through a calibrated section of the prover.

Here, the volume of the calibrated section is restricted by cross-section flats in which the detectors are installed; it's recognized as the volume reference standard unit.

Contact or contactless sensors are used as detectors in various designs of provers—on an electromechanical, optical or other physical basis, that detectors are able to detect a moment when the piston is passing through the cross section of the pipe section in which the detector is installed with a high accuracy. The provers of this type utilize a piston in the form of an elastic ball, which is "pumped" by a liquid filler up to a diameter that is 2-3% larger than the internal diameter of the calibrated pipe section area, to ensure a high quality fit of the ball piston to the internal surface of the pipe along the cylindrical contact belt between them.

The physical essence of verification is to compare the volume of liquid measured by a calibrated meter during the passage of the ball piston from the beginning to the end of the calibrated section with the known volume of the calibrated section, which is taken as a reference standard.

During calibration, verification and MMC of liquid mass meters incorporated in a prover (or used together with a prover), a liquid density measuring transducer is used, which allows for comparing the mass of a liquid measured by a mass meter with the mass obtained on the basis of the calibrated prover volume (reference standard) and density of the pumped liquid measured in the flow.

As the patent information search showed, the topic of calibration or verification tests for measuring the amount of petroleum produced was a fertile object of an inventive activity for more than a century (the priority of the oldest discovered patent on this topic dates back to 1910). Dozens of inventions were published; the most relevant patents and patent applications are summarized in Table 1.

TABLE 1

| Pat. No. | Title | Assignee | Priority date | Publication date |
|---|---|---|---|---|
| U.S. Pat. No. 3,288,163 | Wiper ring for a fluid system flow interrupting device | Grove valve & regulator Co (USA) | 05.09.1963 | 29.11.1966 |
| U.S. Pat. No. 3,423,988 | Meter prover apparatus | M & J valve Co (USA) | 01.08.1966 | 28.01.1969 |
| U.S. Pat. No. 3,668,923 | Meter proving method and apparatus | M & J valve Co (USA) | 19.06.1970 | 13.06.1972 |
| U.S. Pat. No. 3,738,153 | Valveless prover | Helmerlich & payne, Inc. (USA) | 24.08.1971 | 12.06.1973 |
| US2007/0119227 | Reference volume tube | Fukuo Moriyama (Jp, inventor) | 25.12.2003 | 31.05.2007 |
| US2014137628 | Method and apparatus for a bidirectional meter proving system | WFMS, Inc. (USA) | 29.05.2008 | 22.05.2014 |
| US2015027197 | Method and apparatus for a bidirectional meter proving system | WFMS, Inc. (USA) | 29.05.2008 | 29.01.2015 |
| RU 2522118 | Flow meter, flow meter calibration method and flow meter prover computer | Daniel Management and Control Inc (USA) | 27.02.2009 | 10.07.2014 |
| RU 2568054 | Method and device for rapid calibration of the flow meter | P. N. Frantsuzov | 24.06.2014 | 10.11.2015 |

TABLE 1-continued

| Pat. No. | Title | Assignee | Priority date | Publication date |
|---|---|---|---|---|
| RU 2603503 | A method of application of the regulating device | P. N. Frantsuzov | 10.06.2014 | 27.11.2016 |

A fragment of the bidirectional prover, the most common in modern practice, is schematically shown in FIG. 1 (borrowed from the patent RU 2522118).

Here 1 is a ball piston; 2, 3, 4, 5—electromechanical detectors; 6—a calibrated section of the prover meter tube; V1 and V2—calibrated volumes. Volumes in the bi-directional prover can be measured by moving the ball piston in two directions: for example, using the first pair of detectors—from detector 2 to detector 3 (calibrated volume V1) and in the opposite direction, using another pair of detectors—from detector 4 to detector 5 (calibrated volume V2). A change in the direction of flow of the verification liquid and, accordingly, the piston is provided by using a 4-way valve at the inlet of the prover; periodically, when turning the 4-way valve to the proportion of turn (moving to the next fixed position), the flow of petroleum is directed along the verification loop alternately in the forward or reverse direction.

It is important to note one characteristic feature of the existing bidirectional provers of this type: the ball passage detectors are installed in pairs, at the ends of the corresponding calibrated volume. The distances between the starting/receiving chambers of the ball piston (chambers are not shown in FIG. 1) and the beginning of the nearest calibrated volume (in both directions of flow) use to accelerate the ball piston until a constant flow rate of the verification liquid in the pipe corresponding to the specified verification flowrate is established; moreover, the ball piston should enter the calibrated volume (under the detector) at the same speed in this test cycle, in order to ensure the required repeatability of measurements on the verification flowrate. The parameters of the calibrated and acceleration sections are determined by design calculations in accordance with the requirements of regulatory documentation.

The volume and length of the calibrated section is determined depending on the characteristics of the flowrate meters, for which verification this calibrated section is assigned, for example, on the maximum verification flowrate. The speed of movement of the ball piston in a calibrated section and the cross-sectional area of the verification pipeline should ensure the possibility of verification of the flowrate meter over the entire prescribed flow range. For bidirectional provers of this type, the speed of the ball piston, as a rule, does not exceed 1.5 m/s.

The length of the acceleration sections is calculated on the basis of the maximum specified flowrate of the verification liquid, taking into account the selected cross section of the calibrated section, the switching time of the 4-way valve of the prover, the response time of the leakage monitoring system. The ball piston, picked up by the flow at the exit of the 4-way valve, must reach a given steady-state speed by the time it enters the nearest calibrated volume.

The movement of the ball piston in the acceleration area of the prover is unsteady, and the flow characteristics through the verifying flowrate meter and prover during this time period are considered as non-sensing. As follows from the above, the bidirectional prover has two similar acceleration section adjacent to the chambers for launch/receipt of the ball piston. The section of the traditional U-shaped prover between the two acceleration sections forms substantially a united calibrated volume. As for closest analogue of the prover of the above-mentioned patent RU 2522118 of the American company Daniel Management And Control, Inc. (priority of Feb. 27, 2008; the application was published on Jul. 10, 2014), two calibrated volumes are placed on the site—V1 and V2 (almost identical in configuration), each of which is used as a verification volume when the ball piston is moving in one of the directions. Detectors 3 and 4 are limiting the volumes from one end, detectors 2 and 5 from the other, all are placed here side by side in two cross section areas of calibrated volume—for structural and technological reasons.

This arrangement of the functional parts of the calibration pipe section and the location of the detectors are most common for provers of this type, and, according to the authors, it can be considered as a drawback: extreme sections of the calibration pipe are acceleration sections only when the ball piston moves in one of two directions, and are excluded from the intended use for both of direction.

It should be noted that the high flowrates of a pumped liquid are provided by large flow cross section areas of pipelines (respectively, dimensions and mass of the prover ball piston are to be increased) and high flow rates. With an increase in flow cross section areas and flow rate, the response time of the 4-way valve is also inevitably increased. Accordingly, large lengths of acceleration areas are required. It is known from practice that on large U-shaped prover acceleration section long may be 15 meters or more. This leads to large dimensions and high metal consumption of the prover design, and requires a large room to accommodate them. Thus, it is impossible to use mobile calibration (verification) installations at large petroleum metering stations (with verifiable flow rates of more than 800 $m^3$/hour).

SUMMARY OF THE INVENTION

The technical task is to create a method and device that provides the desired repeatability and standard deviation of measurement results, with a significantly shorter test duration, dimensions and weight of the device.

The technical result of the implementation of the present invention is to increase productivity during calibration, verification, monitoring of the metrological characteristics of flowrate meters, while achieving the best overall mass characteristics of the device (prover) and, as a result, expanding the possibility of their mobile use, reducing material intensity structures, reducing the cost of construction and installation of petroleum metering stations.

The technical result is achieved due to the fact that the method of control of the metrological characteristics of the flow meter of the amount of liquid using a bidirectional prover, based on comparing the indicators of the amount of liquid measured by the calibrated liquid meter with the amount of liquid flowing through the calibrated portion of the prover, taken as the reference standard unit of volume, time of passage of the calibrated area by the ball piston, comprising multiple movements of the ball piston in the forward and reverse direction with the flow of a verification liquid through the measuring pipeline of the prover, connected sequentially to a measuring pipeline, in which a calibrated liquid meter is installed, and wherein during each movement there is a fixation of moments using detectors when the ball piston is passing by the starting and ending points of the calibrated portion; wherein the starting area of the ball piston movement in each of the directions is an acceleration area that is required for the movement of the ball piston to reach a speed of a free flow at a given verification liquid flowrate, wherein a portion of the prover, located last along the direction of movement of the ball piston and serving as an acceleration area when the ball piston is moving in an opposite direction, is used as an addition to the calibrated portion.

A bidirectional prover for implementation of the above method comprises a measuring pipeline, with two chambers for receiving and launching a ball piston, with at least two calibrated areas, in end sections of which there is one or more ball passage sensors with at least two acceleration areas preceding the calibrated areas in the direction of movement of the ball piston, wherein the portion of the measuring pipeline of the prover is located last along the direction of movement of the ball piston to ensure the use of this portion to extend or supplement the calibrated portion, and this portion is equipped with one or more detectors installed in the end cross-section of the portion close to the chamber used for the ball piston receiving and launching.

In each of the flow directions of the verification liquid and the ball piston, two calibrated volumes V1 (primary), V3 (additional, serves as an acceleration area when the ball piston is moving in the opposite direction) and V2 (primary), V4 (additional, serves as an acceleration area when the ball piston is moving in the opposite direction) may be sequentially formed, wherein detectors are installed in the boundary areas of the measuring pipeline, which separate supplementary volumes V3 and V4 from the main calibrated volumes V1 and V2, the detectors are connected in such a way that each of them has the ability to issue a signal to the information processing system when the ball piston is passing only in one of the directions.

The measuring pipeline of the prover may consist of two areas, each of which is alternately used as an acceleration area and as calibrated area (an "economy version" of the embodiment).

DETAILED DESCRIPTION OF THE INVENTION

Figure 1:
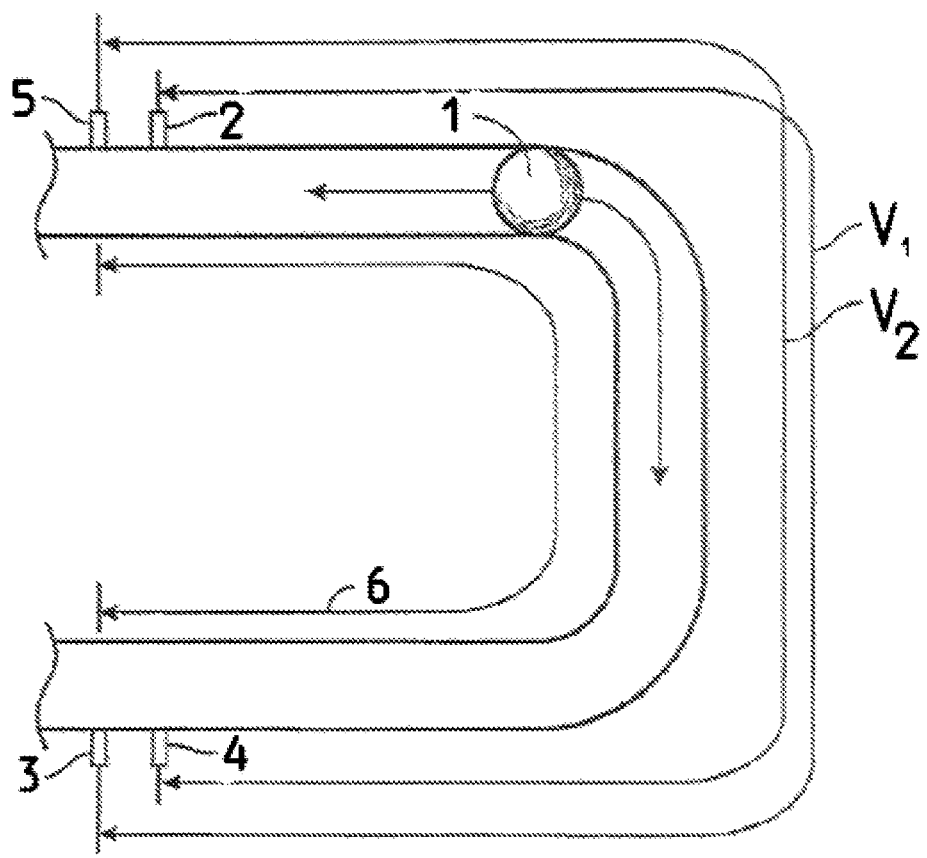
FIG. 1—Fragment of the pipeline loop for the closest analogue of the invention (according to the patent RU 2522118).

The basis of the claimed invention is the well-known U-shaped design of a bidirectional piston prover. FIG. 1 schematically shows a fragment of the bidirectional prover, in which: 1—ball piston; 2, 3, 4, 5—electromechanical detectors; 6—calibrated section of the measuring pipeline 7; V1 and V2—calibrated volumes. Volumes in the bi-directional prover are measured when the ball piston moves in two directions: using the first pair of detectors—from detector 2 to detector 3 (the calibrated volume V1) and in the opposite direction, using another pair of detectors—from detector 4 to detector 5 (the calibrated volume V2). The change in the direction of flow of the verification liquid and, accordingly, the piston is ensured by using the well-known 4-way valve at the inlet/outlet of the prover. Periodically, when turning the 4-way valve to the proportion of turnover (moving to the next fixed position), the flow of petroleum is directed along the verification loop alternately in the forward and reverse direction. At the same time, taking into account the results of measurements, one of the flow directions is conventionally taken as the direct, and the other as the reverse.

It is important to note one characteristic feature of the existing bidirectional provers of this type: the ball passage detectors are installed in pairs, at the ends of the corresponding calibrated volume. The areas between the launching/receiving chambers of the ball piston (not shown in FIG. 1) and the beginning of the nearest calibrated volume (in both directions of flow) serve to accelerate the ball piston until a constant flow rate of the verification liquid in the pipeline corresponding to the specified verification flowrate is established; moreover, the ball piston should enter the calibrated volume (under the detector) at the same speed in this test cycle, in order to ensure the required repeatability of measurements on the verification flow. The parameters of the calibrated and acceleration areas are determined by design calculations in accordance with the requirements of regulatory documentation.

The volume and length of the calibrated area is determined depending on the characteristics of the flowrate meters, for which verification this calibrated area is assigned, for example, on the maximum verification flowrate. The speed of movement of the ball piston in a calibrated area and the cross-sectional area of the verification pipeline should ensure the possibility of verification of the flowrate meter over the entire prescribed flow range. For bidirectional provers of this type, the speed of the ball piston, as a rule, does not exceed 1.5 m/s.

The length of the acceleration areas is calculated on the basis of the maximum specified flowrate of the verification liquid, taking into account the selected cross section of the calibrated area, the switching time of the 4-way valve of the prover, the response time of the leakage monitoring system. The ball piston, picked up by the flow at the exit of the 4-way valve, must reach a given steady-state speed by the time it enters the nearest calibrated volume.

The movement of the ball piston in the acceleration area of the prover is unsteady, and the flow characteristics through the verifying flowrate meter and prover during this time period are considered as non-sensing. As follows from the above, the bidirectional prover has two similar acceleration sites adjacent to the chambers for launch/receipt of the ball piston. The portion of the traditional U-shaped measuring pipeline between the two acceleration areas forms a substantially united calibrated volume. In the closest analogue of the prover (FIG. 1) two calibrated volumes are placed on the site—V1 and V2 (almost identical in configuration), each of which is used as a verification volume when the ball piston is moving in one of the directions. Detectors 3 and 4 are limiting the volumes from one end, detectors 2 and 5 from the other, all are placed here side by side in two cross section areas of calibrated volume—for structural and technological considerations. This arrangement of the functional areas of the test pipeline and the location of the detectors are most common for provers of this type.

Figure 2:
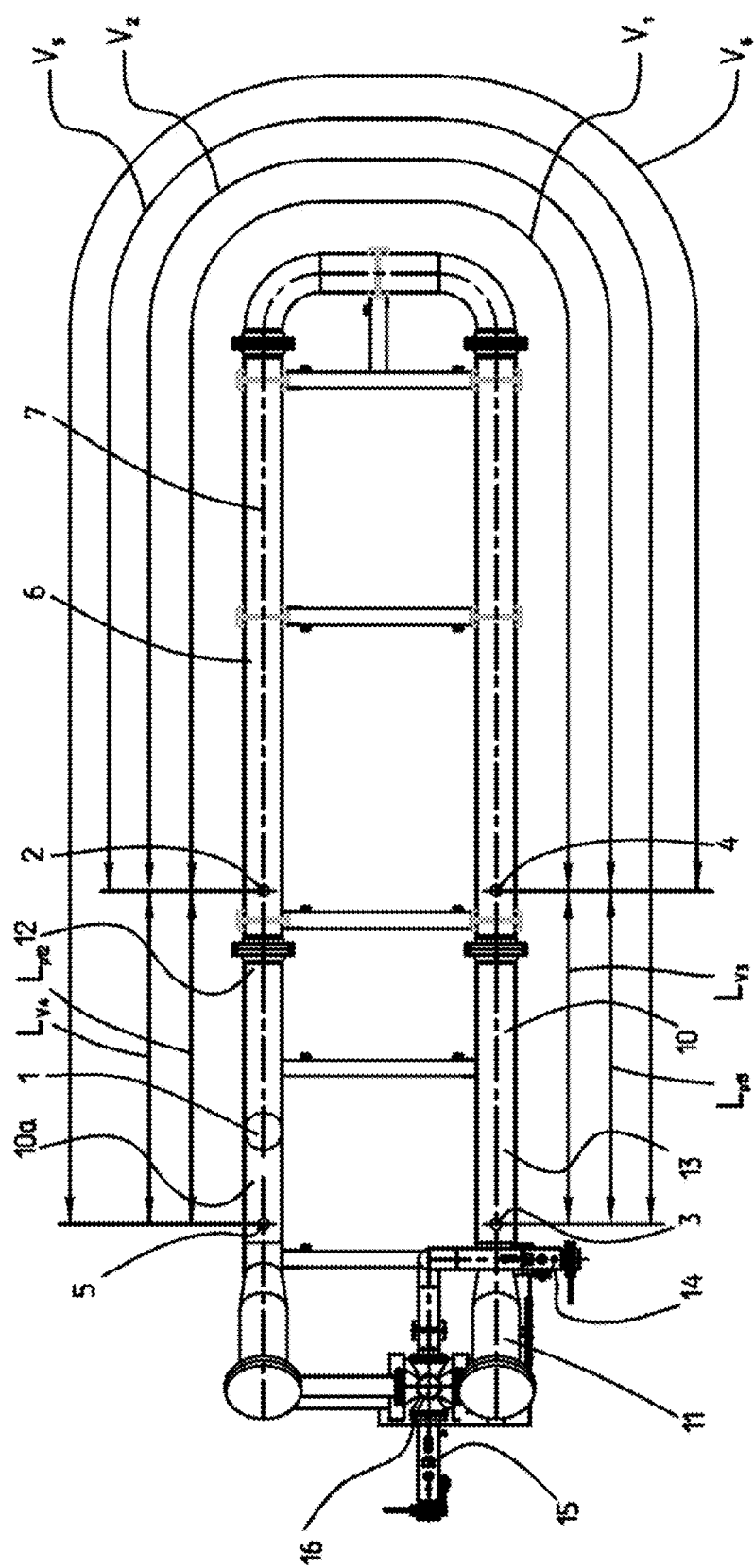
FIG. 2 is a plan view of the claimed prover.
Figure 3:
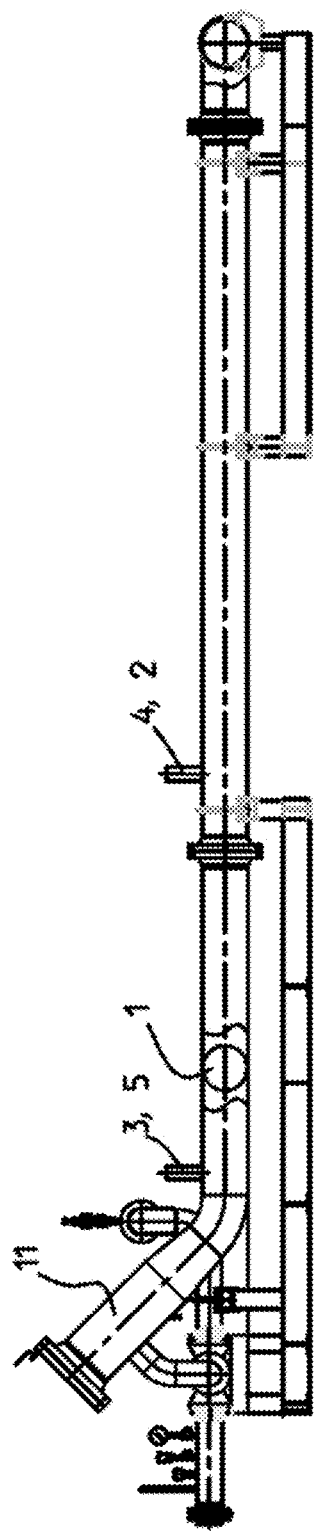
FIG. 3 is a side view of the claimed prover.

The main feature of the claimed invention is to increase the calibrated part of the measuring pipeline in each direction of movement of the ball piston by the size of the area that is an acceleration area when the ball moves in the oncoming direction (i.e., each acceleration area is used as an verification area during counter movement of the ball piston). FIG. 2 shows a plan view of a prover according to one embodiment of the present invention, where: 1 is a ball piston; 2, 3, 4, 5—detectors; V1 and V2—the basic calibrated volumes of the measuring pipeline of the prover; 10 and 10a are additional calibrated volumes (V3 and V4) acquired as a result of the present invention; 11—chamber for launching/receiving a ball piston; 12 ($L_{p12}$)—acceleration area of the ball piston (for the calibrated volume V1); 13 ($L_{p13}$)—the acceleration of the ball piston (for the calibrated volume V2); 14, 15—input and output pipelines for petroleum; 16-4-way valve. Moreover, V1=V2, $L_{V3}=L_{p12}$, $L_{V4}=L_{p13}$, V5=V1+V3, V6=V2+V4, where V5 and V6 are full (increased according to this invention) calibrated volumes—instead of basic V1 and V2. In FIG. 2, the calibrated volume V1 is increased due to area 10, and the calibrated volume V2 is increased due to area 10a. Such a change allows, without increasing the overall size of the prover, to improve the repeatability and standard deviation of measurement results, to reduce the effect of liquid flow pulsations caused by liquid transfer technology through pipelines, allows for the transfer of a unit of volume with less uncertainty of volume measurements under operating conditions. FIG. 3 shows the side view of the same prover.

The method of controlling of the metrological characteristics of a liquid flowrate meter using a bi-directional prover comprises multiple, two-way displacements of the ball piston with the flow of the verification liquid along the measuring pipeline of the prover connected sequentially with the measuring line, in which the tested flowrate meter is installed, and wherein during each displacement there is a fixation of moments using a pair of detectors when the ball piston is passing by the starting and ending points of the calibrated area. The volume of liquid measured by the tested flowrate meter during the time the ball piston passes the calibrated area of the verification pipeline is compared to the known volume of the calibrated area of the verification pipeline. In other words, the difference of the method according to the present invention is that the acceleration area of the verification pipeline, which is required for the movement of the ball piston to reach a speed close to the speed of free flow at a given flowrate of the verification liquid, is used as a calibrated area during the oncoming movement of the ball piston.

The change in the direction of flow of the testing liquid and the ball piston to the opposite that is required to create an alternate movement of the ball piston along the loop of the prover verification pipe in two directions, is provided in a known manner, for example, switching the 4-way valve to a predetermined part of the turn, which is installed on the inlet/outlet of the verification liquid flow. At the same time, taking into account the results of measurements, one of the flow directions is conventionally taken as the direct, and the other as the reverse.

The lengths of the first and last areas of the measuring pipeline of the prover are determined by calculation and/or experimental method, based on the need to perform operations during this time to change the direction of movement of the ball piston to the opposite, namely: guaranteed establishment of a constant speed of movement of the ball piston in these areas, the speed that satisfies the test conditions over the entire range of specified flow rates of the verification liquid and switching the 4-way valve to the specified position and triggering its leakage monitoring system.

A bidirectional prover for implementing this method includes a U-shaped or a loop-shaped measuring pipeline with two chambers for receiving and launching a ball piston, with at least two calibrated areas, in the end areas of which one or more ball piston passage detectors are installed, and with at least two acceleration areas preceding the calibrated areas in the direction of movement of the ball piston. Further, the portion of the measuring pipeline of the prover is located last along the direction of movement of the ball piston to ensure the use of this portion to extend or supplement the calibrated portion, and this portion is equipped with one or more detectors installed in the end cross-section of the portion close to the chamber used for the ball piston receiving and launching.

The design of the prover according to the present invention provides a solution to the task of provide to the areas of acceleration of the ball piston with an additional function to be a calibrated (verification) area—during opposite movement of the flow. The internal surface of the pipeline in these areas must be made with the required accuracy and quality to ensure stable coupling with the ball piston in order to enable the ball piston to move at a speed as close as possible to the speed of a free flow.

Figure 4:
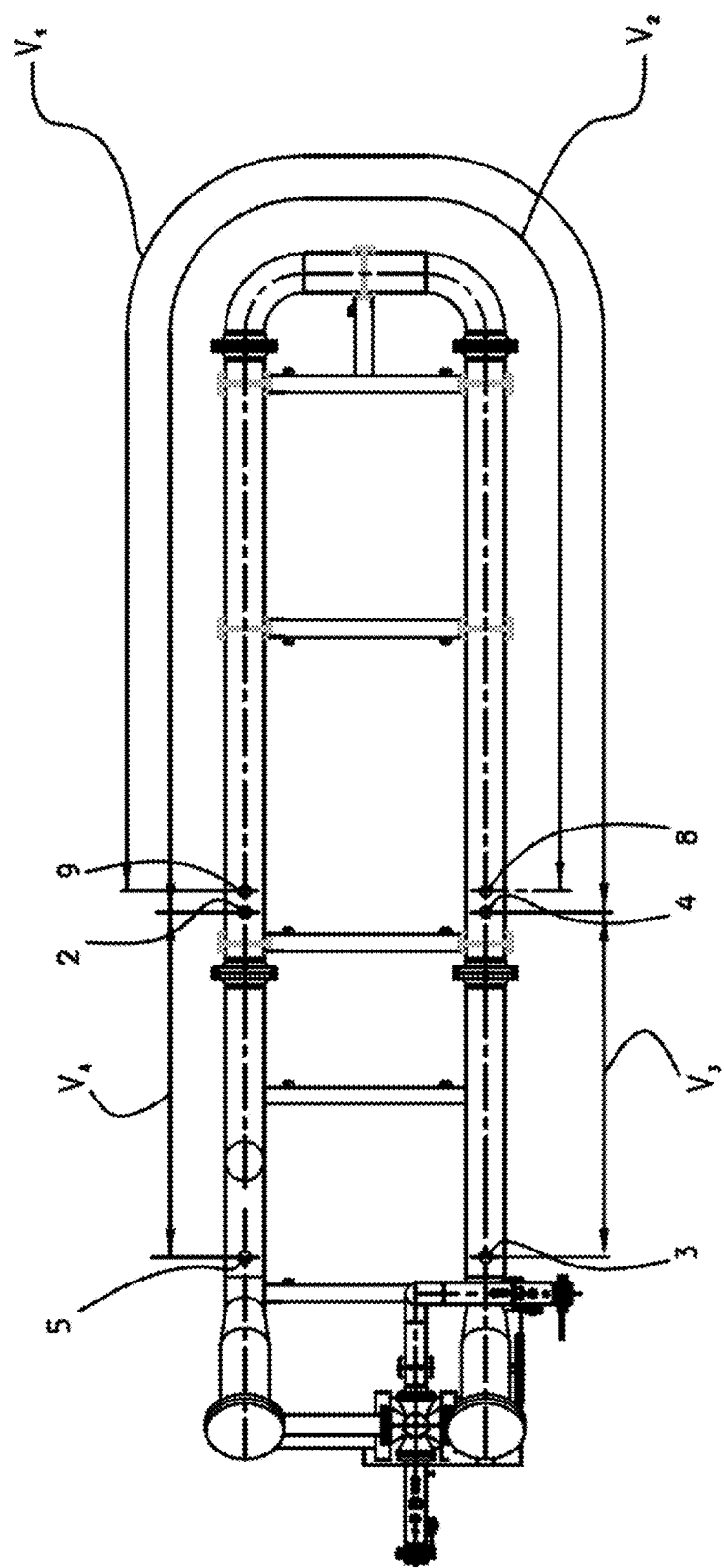
FIG. 4 is a plan view of the claimed prover (as described in claim 3 of the claims)

The verification pipeline may contain a larger number of detector pairs and, accordingly, calibrated areas—in order to further increase the reliability and quality of the verification measurements, or—to reduce the test duration—by increasing the number of calibrated volumes taken into account during each pass. FIG. 4 shows the prover, supplemented by detectors 8 and 9, with the result that separate the calibrated volumes V1, V2, V3 and V4 are formed. In each of the flow directions, two calibrated volumes V1 (primary), V3 (additional, serves as an acceleration area when the ball piston is moving in the opposite direction) and V2 (primary), V4 (additional, serves as an acceleration area when the ball piston is moving in the opposite direction) are formed, wherein detectors are installed in the boundary areas of the measuring pipeline, which separate supplementary volumes V3 and V4 from the main calibrated volumes V1 and V2, the detectors are connected in such a way that each of them has the ability to issue a signal to the information processing system when the ball piston is passing only in one of the directions—for reasons of reliability and quality of verification measurements.

Figure 5:
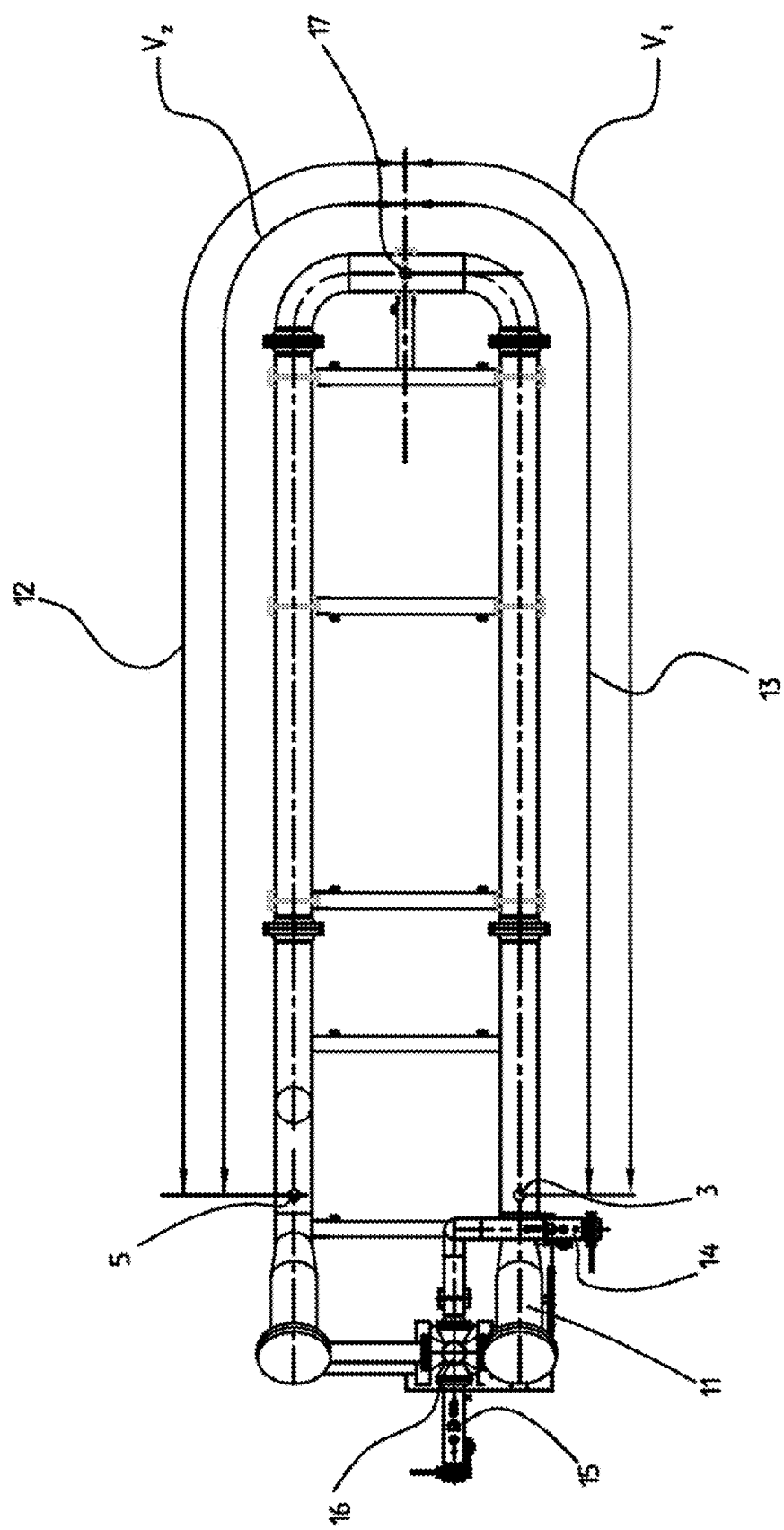
FIG. 5 is a plan view of the claimed prover (as described in claim 4 of the claims).

FIG. 5 shows the embodiment of the prover, made for a maximum cost reduction, in which the number of functional areas of the measuring pipeline and the number of detectors are minimized. Here, V1 and V2 are the calibrated volumes of the prover verification pipeline; 3, 5 and 17—detectors; 12—acceleration area of the ball piston (for the calibrated volume V1); 13—acceleration area of the ball piston (for the calibrated volume V2). The measuring pipeline of this prover includes three detectors and two areas, each of which is alternately used as an acceleration area and as calibrated area for multiple movements of the ball piston, which also reduces the cost of equipping the prover.

As a result of carrying out the invention, by giving the ball piston acceleration areas an additional function of a calibrated (verification) area—with a counter-flow movement, a prover having a given calibrated volume can be implemented as having significantly smaller dimensions, mass and used material. In particular, most of the provers required for verification of quantities of petroleum production and petroleum transportation can be implemented in a mobile (transported) version, which significantly reduces the cost of assembly and equipment on petroleum metering stations.

Installation of additional detectors allows for splitting the route of the measuring pipeline into a larger number of calibrated areas, thereby reducing the number of required passes during verification tests, and as result, duration of the verification work decreasing.

On the other hand, utilization of longer calibrated areas allows for higher reliability of measurement results in each pass.

We claim:

1. A method for verification of a flowmeter using a bidirectional prover, the method comprising comparing liquid quantity according to data measured by the flowmeter, with a quantity of liquid flowing through a calibrated section of the prover while a ball piston of the prover is passing through the calibrated section which is taken as a certificated unit of volume,
    wherein the ball piston is configured to accomplish multiple movements in two, opposing directions, with a flow of a verification liquid through a measuring pipe of the prover, sequentially connected to a measuring line, in which the flowmeter is installed,
    wherein a measuring pipeline of the prover comprises an acceleration section (prerun) that is required to increase the ball piston velocity to equate to the speed of free liquid flow, and a calibrated section between its start cross-section and its end cross-section for both directions of the ball piston's movements,
    wherein detectors detect intersection of the start cross-section and the end cross-section of the calibrated section by the ball piston movement during running of the ball piston in a first, current direction and intersection of the start cross-section and end cross-section of the calibrated section during running of the ball piston in a second, reverse direction,
    wherein the tube section, being an acceleration section (prerun) for reverse movement, is used as an additional calibrated section or as an additional part of the calibrated section for current direction, and the tube section, being an acceleration section (prerun) for direct movement, is used as the additional calibrated section or as an additional part for the calibrated section for reverse direction.

2. A bidirectional prover for implementing the method according to claim 1, comprising the measuring pipe, having two or more calibrated sections, delimited by cross-sections including the detectors,
    two acceleration sections (preruns), preceding the calibrated sections in the directions of movement of the ball piston,
    two chambers for receiving and launching the ball piston, preceding the acceleration sections (preruns) in each direction of movement of the ball piston,
    wherein each farthest calibrated section on the current direction of movement includes the acceleration section, destined for opposing direction of the ball piston movement.

3. The bidirectional prover according to claim 2, wherein the measuring pipe comprises for each direction of ball piston movement a primary calibrated section and a supplemental calibrated section, that is the acceleration section for opposing direction of the ball piston movement too.

4. The bidirectional prover according to claim 2, wherein the measuring pipe comprises two of the sections, the sections alternately being used as an acceleration section or as an calibrated section.

* * * * *